(12) United States Patent
Takeoka et al.

(10) Patent No.: US 9,595,389 B2
(45) Date of Patent: Mar. 14, 2017

(54) FILM CAPACITOR

(71) Applicant: Panasonic Intellectual Property Management Co., Ltd., Osaka (JP)

(72) Inventors: Hiroki Takeoka, Nara (JP); Yasuhiro Hiraki, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 156 days.

(21) Appl. No.: 14/398,989

(22) PCT Filed: May 20, 2013

(86) PCT No.: PCT/JP2013/003179
§ 371 (c)(1),
(2) Date: Nov. 5, 2014

(87) PCT Pub. No.: WO2013/179605
PCT Pub. Date: Dec. 5, 2013

(65) Prior Publication Data
US 2015/0116904 A1    Apr. 30, 2015

(30) Foreign Application Priority Data

May 29, 2012  (JP) ................. 2012-121546

(51) Int. Cl.
*H01G 4/015*  (2006.01)
*H01G 4/08*  (2006.01)
(Continued)

(52) U.S. Cl.
CPC .............. *H01G 4/18* (2013.01); *H01G 4/008* (2013.01); *H01G 4/015* (2013.01); *H01G 4/145* (2013.01);
(Continued)

(58) Field of Classification Search
CPC ................. H01G 4/015; H01G 4/32
(Continued)

(56) References Cited

U.S. PATENT DOCUMENTS

2008/0278888 A1* 11/2008 Yang ................. H01G 2/16
361/323
2012/0232209 A1    9/2012 Masuda et al.

FOREIGN PATENT DOCUMENTS

JP          07086088 A  *  3/1995
JP          08250367 A  *  9/1996
(Continued)

OTHER PUBLICATIONS

International Search Report issued Jul. 30, 2013 in International (PCT) Application No. PCT/JP2013/003179.

*Primary Examiner* — Eric Thomas
(74) *Attorney, Agent, or Firm* — Wenderoth, Lind & Ponack, L.L.P.

(57) ABSTRACT

A film capacitor includes a first electrode layer, a second electrode layer, and a dielectric film disposed between the first and second electrode layers. The dielectric film mainly contains a styrene polymer having a syndiotactic structure. The first electrode layer includes first small electrode segments and a first fuse which interconnects the first small electrode segments. A value obtained by dividing an area of each of the plurality of first small electrode segments by the third power of a thickness of the dielectric film is not smaller than $0.4 \times 10^{13}$/m and not larger than $5.0 \times 10^{13}$/m. The film capacitor has a high withstanding voltage.

20 Claims, 7 Drawing Sheets

(51) Int. Cl.
   *H01G 4/18*    (2006.01)
   *H01G 4/008*   (2006.01)
   *H01G 4/14*    (2006.01)
   *H01G 9/10*    (2006.01)
   *H01G 9/15*    (2006.01)

(52) U.S. Cl.
   CPC .............. *H01G 9/10* (2013.01); *H01G 9/15* (2013.01); *Y02T 10/7022* (2013.01)

(58) Field of Classification Search
   USPC .................................. 361/273, 323, 301.5
   See application file for complete search history.

(56) References Cited

FOREIGN PATENT DOCUMENTS

| | | | |
|---|---|---|---|
| JP | 09270359 A | * | 10/1997 |
| JP | 10-092688 | | 4/1998 |
| JP | 2000-008156 | | 1/2000 |
| JP | 2009-000957 | | 1/2009 |
| WO | 2011-065585 | | 6/2011 |

* cited by examiner

| Sample No. | Width W₁ (cm) | Length L₁ (cm) | Area S₁ (cm²) | Thickness d₁ (μm) | Value A (×10¹³/m) | Safety Property | Life-Time Property |
|---|---|---|---|---|---|---|---|
| 1 | 2.0 | 0.25 | 0.5 | 2.0 | 0.6 | G | G |
| 2 | 2.0 | 0.5 | 1.0 | 2.0 | 1.3 | G | G |
| 3 | 2.0 | 1.5 | 3.0 | 2.0 | 3.8 | G | G |
| 4 | 2.0 | 2.0 | 4.0 | 2.0 | 5.0 | G | F |
| 5 | 2.0 | 3.0 | 6.0 | 2.0 | 7.5 | G | NG |
| 6 | 2.0 | 0.25 | 0.5 | 2.5 | 0.3 | NG | G |
| 7 | 2.0 | 0.5 | 1.0 | 2.5 | 0.6 | G | G |
| 8 | 2.0 | 1.5 | 3.0 | 2.5 | 1.9 | G | G |
| 9 | 2.0 | 2.0 | 4.0 | 2.5 | 2.6 | G | G |
| 10 | 2.0 | 3.0 | 6.0 | 2.5 | 3.8 | G | G |
| 11 | 2.0 | 0.25 | 0.5 | 3.0 | 0.2 | NG | NG |
| 12 | 2.0 | 0.5 | 1.0 | 3.0 | 0.4 | G | G |
| 13 | 2.0 | 1.5 | 3.0 | 3.0 | 1.1 | G | G |
| 14 | 2.0 | 2.0 | 4.0 | 3.0 | 1.5 | G | G |
| 15 | 2.0 | 3.0 | 6.0 | 3.0 | 2.2 | G | G |

FIG. 4

| Sample No. | Surface Roughness Ra (nm) | Area S₁ (cm²) | Thickness d₁ (μm) | Value A (×10¹³/m) | Safety Property | Life-Time Property |
|---|---|---|---|---|---|---|
| 16 | 15 | 1.0 | 2.0 | 0.6 | F | G |
| 17 | 20 | 1.0 | 2.0 | 0.6 | G | G |
| 7 | 45 | 1.0 | 2.0 | 0.6 | G | G |
| 18 | 100 | 1.0 | 2.0 | 0.6 | G | G |
| 19 | 150 | 1.0 | 2.0 | 0.6 | G | F |

FILM CAPACITOR

This application is a U.S. national stage application of the PCT International Application No. PCT/JP2013/003179, filed May 20, 2013.

TECHNICAL FIELD

The present invention relates to film capacitors used in various electronic devices, electric apparatuses, industrial equipment, automobiles, and the like, and particularly to a film capacitor used for smoothing, filtering, snubbering, and the like, in an inverter circuit for driving a motor of a hybrid vehicle.

BACKGROUND ART

In recent years, from the viewpoint of environmental protection, various electric apparatuses have been controlled by inverter circuits to save energy and achieve higher efficiency. In particular, the automobile industry has been actively developing environmental-friendly, energy-saving, and highly-efficient techniques. These techniques put hybrid vehicles (hereinafter, referred to as HEVs) that are driven with an electric motor and an engine, in the market.

The electric motor for the HEVs is operated in a high voltage range of several hundred volts. Accordingly, a film capacitor having electric characteristics, such as high withstanding voltage with low loss, has attracted attention as a capacitor to be used for the electric motor.

In general, film capacitors are roughly separated into two groups: capacitors including electrodes made of metal foil; and capacitors including electrodes made of metal films, e.g. vapor-deposited on dielectric films. The capacitors including the vapor-deposited metal film electrodes has a smaller volume occupied by the electrodes than the capacitors including the metal foil electrodes, consequently having a small size and a light weight. The vapor-deposited electrode layers have a self-recovery function, generally referred to as a self-healing property, in which a portion around a defective portion including insulation failure vaporizes and scatters, so that the capacitor recovers its function. This provides high reliability against dielectric breakdown. A thinner electrode layer is more likely to vaporize and scatter, which improves the self-healing property. As a result, higher withstanding voltage can be obtained.

Figure 7:
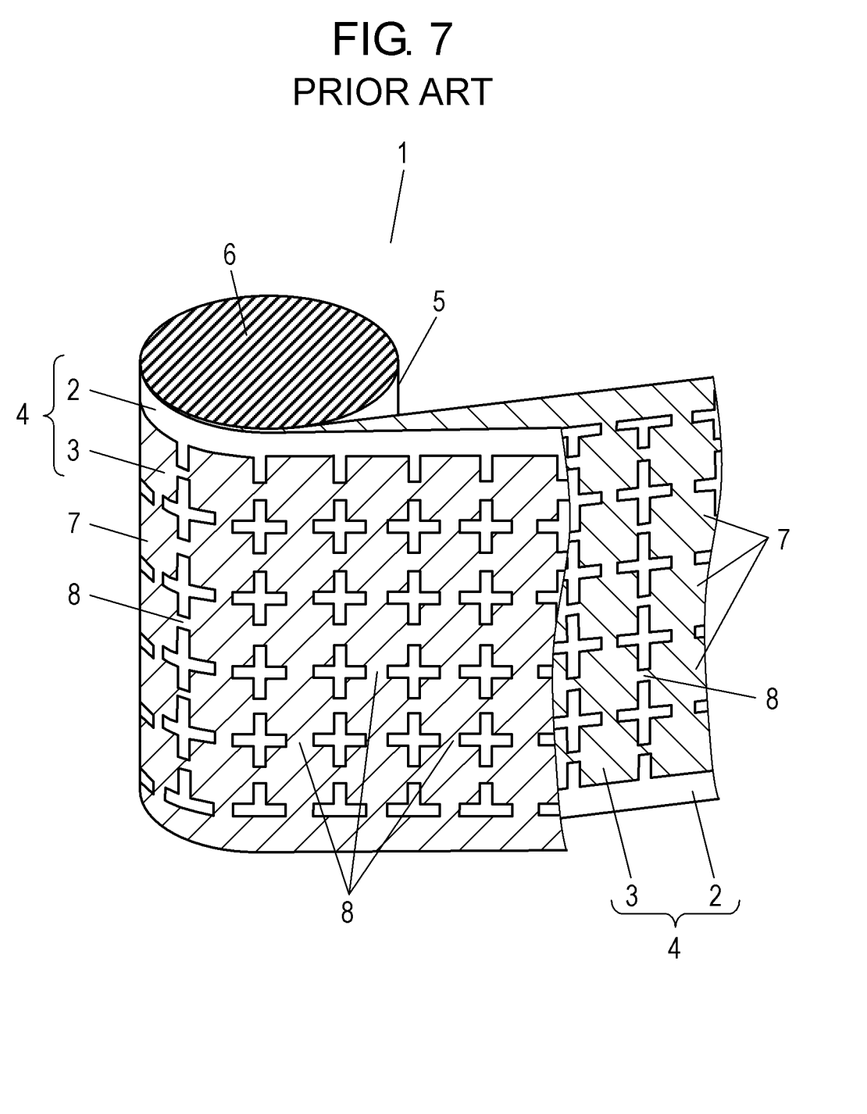
FIG. 7 is a perspective view of a conventional capacitor element.

FIG. 7 is a perspective view of capacitor element 1 of a conventional film capacitor. Capacitor element 1 includes a pair of metalized films 4 each having dielectric film 2 and electrode layer 3 disposed on dielectric film 2. Metalized films 4 are stacked and wound such that respective electrode layers 3 face each other across dielectric film 2. A pair of external electrodes 6 is disposed on different end faces of capacitor element 1.

Each of electrode layers 3 is divided into small electrode segments 7 which are interconnected with fuses 8. If a segment out of small electrode segments 7 is short-circuited and overcurrent is caused, fuses 8 connected to short-circuited small electrode segment 7 melts and separates this small electrode segment 7 from the other of small electrode segments 7. This recovers insulation of overall small electrode segments 7. Although such an operation slightly reduces the capacitance, high withstanding voltage is maintained.

A resin film is used as each of dielectric films 2. Examples of the resin film include polypropylene, polyethylene-terephthalate, polyethylene-naphthalate, and polyphenyle-sulfide. In recent years, in order to increase heat resistance property, a styrene polymer having a syndiotactic structure has started to be used as a new film material.

PTL 1 discloses a conventional film capacitor which includes a film containing a styrene polymer having a syndiotactic structure.

CITATION LIST

Patent Literature

PTL 1: WO 2011/065585

SUMMARY

A film capacitor includes a first electrode layer, a second electrode layer, and a dielectric film disposed between the first and second electrode layers. The dielectric film mainly contains a styrene polymer having a syndiotactic structure. The first electrode layer includes first small electrode segments and a first fuse which interconnects the first small electrode segments. A value obtained by dividing the area of each of the first small electrode segments by the third power of a thickness of the dielectric film is not smaller than $0.4 \times 10^{13}$/m and $5.0 \times 10^{13}$/m.

DETAIL DESCRIPTION OF PREFERRED EMBODIMENT

Figure 1:
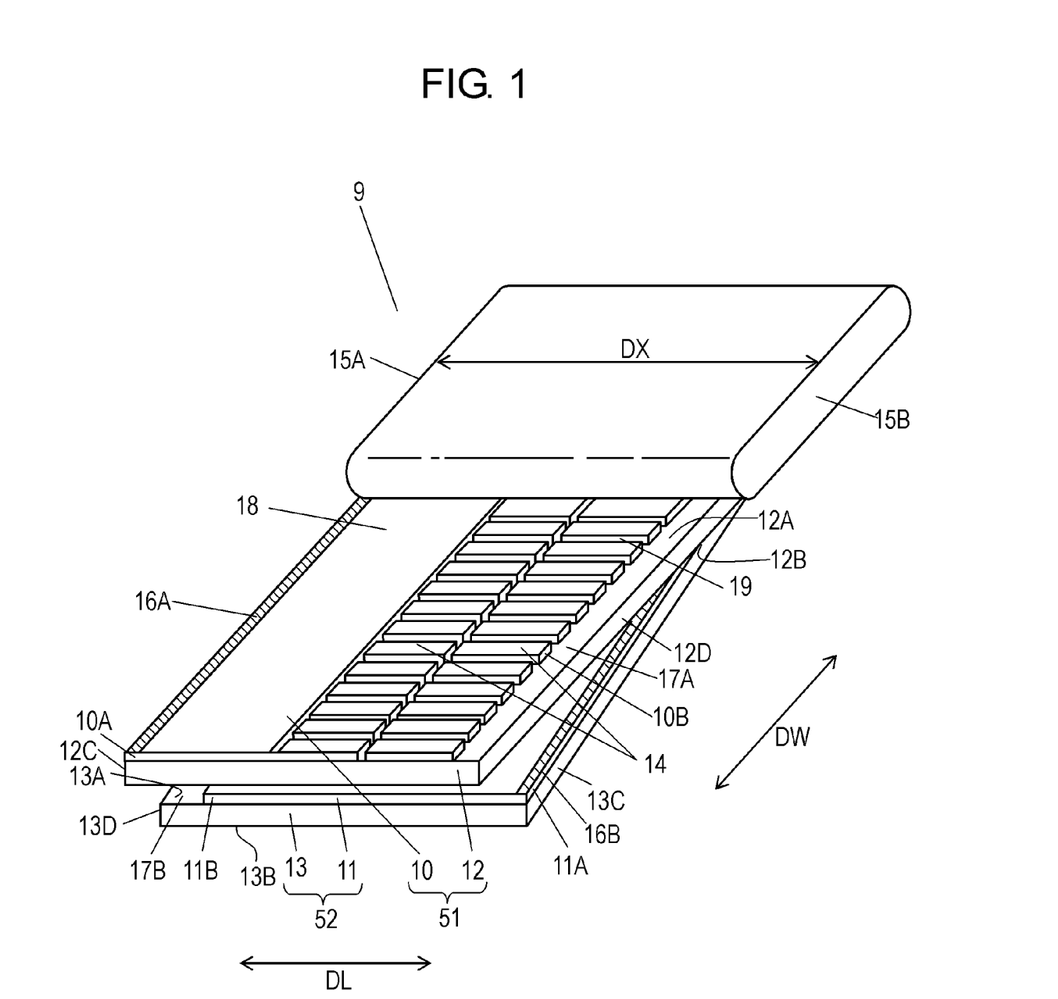
FIG. 1 is a perspective view of a capacitor element of a film capacitor according to an exemplary embodiment.

FIG. 1 is a perspective view of capacitor element 9 of a film capacitor according to an exemplary embodiment. Capacitor element 9 includes metalized films 51 and 52 and external electrodes 15A and 15B. Metalized film 51 includes dielectric film 12 and electrode layer 10 disposed on dielectric film 12. Metalized film 52 includes dielectric film 13 and electrode layer 11 disposed on dielectric film 13. According to the embodiment, electrode layer 10 functions as a positive electrode layer while electrode layer 11 functions as a negative electrode layer. However, electrode layers 10 and 11 may have polarities opposite to the above, or may have no polarities. Dielectric film 12 has surface 12A and surface 12B opposite surface 12A. Electrode layer 10 is disposed on surface 12A. Dielectric film 13 has surface 13A and surface 13B opposite surface 13A. Electrode layer 11 is disposed on surface 13A. Metalized films 51 and 52 are stacked and wound such that electrode layer 11 is positioned on surface 12B of dielectric film 12, and electrode layer 10 is positioned on surface 13B of dielectric film 13. In capacitor element 9 including the film layers wound as described above, dielectric film 12 is disposed between electrode layer 10 and electrode layer 11 at a certain layer, and dielectric film 13 is disposed between electrode layer 10 and electrode layer 11 in a layer adjacent to the certain layer.

Dielectric films 12 and 13 are made of a resin mainly containing a styrene polymer having a syndiotactic structure as a major material. Here, the major material of the resin refers to a material which occupies not smaller than 50 wt % of the resin.

At least one of electrode layer 10 and electrode layer 11 includes small electrode segments 14 and fuses which interconnect small electrode segments 14. Value A obtained by dividing the area of each of small electrode segments 14 by the third power of the thickness of each of dielectric films 12 and 13 is not smaller than $0.4 \times 10^{13}$/m and $5.0 \times 10^{13}$/m.

Electrode layers 10 and 11 are made of a conductive material, such as aluminum, zinc, magnesium or silicon, or an alloy of these metals.

Dielectric films 12 and 13 are biaxially-stretched films mainly containing a styrene polymer having a syndiotactic structure as a main component. In addition to the styrene polymer, dielectric films 12 and 13 may further contain an additive, such as antioxidant, non-crystalline polymer, or inert fine particles.

A styrene polymer having a syndiotactic structure has a stereochemical structure having a main chain made of carbon-carbon bonds, and side chains made of phenyl groups and substituted phenyl groups alternately positioned in opposite directions.

In general, tacticity is quantitatively determined by nuclear magnetic resonance by isotopic carbons (a 13C-NMR method), and can be defined by the proportion of successive structural units. For example, it is a dyad in the case of two units, a triad in the case of three units, and a pentad in the case of five units.

In the film capacitor according to the embodiment, styrene polymers having a syndiotactic structure may include: polystyrene, poly(alkylstyrene), poly(halogenated styrene), poly(alkoxystyrene), and poly(vinyl benzoate) with syndiotacticity having not smaller than 75%, preferably not smaller than 85% racemic dyads (r), or not smaller 30% preferably not smaller than 50% racemic pentads (rrrr); polymers obtained by partially hydrogenating these benzene rings; mixtures thereof; and copolymers containing these structural units.

Examples of poly(alkylstyrene) include poly(methylstyrene), poly(ethylstyrene), poly(propylstyrene), poly(butylstyrene), poly(phenylstyrene), poly(vinylnaphthalene), poly(vinylstyrene), and poly(acenaphthylene).

Examples of poly(halogenated styrene) include poly(chlorostyrene), poly(bromostyrene), and poly(fluorostyrene).

Examples of poly(alkoxystyrene) include poly(methoxystyrene) and poly(ethoxystyrene).

Particularly preferred styrene polymers among the above are polystyrene, poly(p-methylstyrene), poly(m-methylstyrene), poly(p-t-butylstyrene), poly(p-chlorostyrene), poly(m-chlorostyrene), poly(p-fluorostyrene), and copolymers of styrene and p-methylstyrene.

Moreover, the styrene polymer may contain a copolymer component and be used as a copolymer. Examples of monomers bound to monomers of the styrene polymer in such a copolymer include: olefin monomers such as ethylene, propylene, butene, hexene, and octane; diene monomers such as butadiene and isoprene; cyclodiene monomers; and polar vinyl monomers such as methyl methacrylate, maleic anhydride, and acrylonitrile.

Such styrene polymers having a syndiotactic structure have much better heat resistance than styrene polymers having an atactic structure.

As necessary, an appropriate amount of an additive, such as an antistatic agent, may be incorporated into the styrene polymer having a syndiotactic structure according to the embodiment. It is preferable that the amount of such additives is not larger than 10 parts by mass per 100 parts by mass of the styrene polymer. When the amount is larger than 10 parts by mass, breakage of dielectric films 12 and 13 is likely to occur during stretching, which may result in a failure to stably produce dielectric films 12 and 13.

The antioxidant added to the styrene polymer is preferably a primary antioxidant. In particular, phenolic antioxidants are preferable. Primary antioxidants have excellent corrosion resistance and can further increase the breakdown voltage.

Dielectric films 12 and 13 contain the antioxidant at not smaller than 0.1% by mass and not larger than 8.0% by mass with respect to the mass of dielectric films 12 and 13. An antioxidant content within the above range provides dielectric films 12 and 13 with a high breakdown voltage. In the case that the antioxidant content is too low, the effect of the addition of the antioxidant is insufficient, thereby decreasing the breakdown voltage and resulting in poor electrical characteristics. In the case that the antioxidant content is too high, the antioxidant is likely to aggregate in dielectric films 12 and 13, hence decreasing the breakdown voltage.

Examples of the non-crystalline polymer to be incorporated into the styrene polymer include a non-crystalline polymer having a glass transition temperature not lower than 130° C.

The non-crystalline polymer preferably has a glass transition temperature higher than that of the styrene polymer. Incorporation of such a non-crystalline polymer into the styrene polymer increases the glass transition temperature as a mixture of the styrene polymer and the non-crystalline polymer, improving heat resistance and higher breakdown voltage at high temperatures. In addition, heat shrinkage of dielectric films 12 and 13 can be minimized. Examples of the non-crystalline polymer include polyphenylene ether.

The amount of the non-crystalline polymer incorporated is preferably not smaller than 5.0% by mass and not smaller than 48% by mass with respect to the mass of the styrene polymer.

In dielectric films 12 and 13 according to the embodiment, the ratio of the content of the non-crystalline polymer to the content of the antioxidant ranges from about 5 to 30, improving electrical characteristics and providing higher heat resistance.

Dielectric films 12 and 13 according to the embodiment may contain inert fine particles. The inert fine particles allow dielectric films 12 and 13 to be easily slid, facilitating winding. Moreover, dielectric films 12 and 13 can prevent passage of air while maintaining a high breakdown voltage.

The inert fine particles preferably have an average particle size not smaller than 0.05 μm and not larger than 3.0 μm. The inert fine particles may be organic fine particles or inorganic fine particles. The inert fine particles may be mixtures of organic and inorganic fine particles.

Examples of organic fine particles include polystyrene resin particles, silicone resin particles, and acrylic resin particles. The inert fine particles preferably have spherical shapes. When polyphenylene ether is used as the non-crystalline polymer, the spherical silicone resin particles have particularly high heat resistance due to a synergistic effect.

Examples of inorganic fine particles include calcium carbonate particles and silica particles. The inorganic fine particles preferably have spherical shapes.

The inert fine particles are preferably contained at a rate not larger than about 5.0% by mass with respect to 100% by mass of dielectric films 12 and 13.

Examples of other additives include resin, such as styrene polymers having an atactic structure, styrene polymers having an isotactic structure, and styrene-maleic anhydride copolymers. These resins are compatible with the styrene polymer having a syndiotactic structure and effective in controlling crystallization in the preparation of a preliminary formed body for stretching. Additionally, such resins improve the subsequent stretching property, allowing the stretching conditions to be easily controlled and a film having excellent dynamic physical property to be obtained. The content of such resin may be preferably not larger than 20 parts by mass per 100 parts by mass of the styrene polymer having a syndiotactic structure.

Moreover, a small amount of resin having a low compatibility with the styrene polymer may be added to dielectric films 12 and 13. Examples of such resins include: polyolefins, such as polyethylene and polypropylene; polyesters, such as polyethylene terephthalate and polyethylene naphthalate; polyamides, such as Nylon 6 and Nylon 6,6; and polyvinyl alcohol. Such incompatible resins can be dispersed in the form of islands in the styrene polymer having a syndiotactic structure. This is effective in imparting moderate gloss after stretching or improving surface slidability. The incompatible resin component content is preferably not larger than 20 parts by mass. An additive, such as an antistatic agent, a coloring agent, and a weatherproofing agent, may further be added to dielectric films 12 and 13.

Dielectric film 2 containing the styrene polymer having a syndiotactic structure in conventional capacitor element 1 illustrated in FIG. 7 causes less scattering of electrode layer 3, thereby causing less blowout of fuses 8. Although this can improve heat resistance, the withstanding voltage of the film capacitor decreases. As described below, capacitor element 9 according to the embodiment has a high withstanding voltage and a long life time.

Example 1

Samples of capacitor element 9 of the film capacitor according to Example 1 of the embodiment were prepared.

Electrode layer 10 is formed on surface 12A of dielectric film 12 by vapor-depositing. Electrode layer 11 is formed on surface 13A of dielectric film 13 by vapor-depositing. Electrode layers 10 and 11 are wound across dielectric films 12 and 13.

In Example 1, electrode layer 10 is formed on one surface 12A of dielectric film 12 by vapor-depositing, and electrode layer 11 is formed on one surface 13A of dielectric film 13 by vapor-depositing. As another method, for example, electrode layer 10 may be formed on surface 12A of dielectric film 12 by vapor-depositing, and electrode layer 11 may be formed on surface 12B of dielectric film 12 by vapor-depositing. In this case, no electrode layer is disposed on dielectric film 13. One of electrode layers 10 and 11 may be formed on dielectric film 12 by vapor-depositing, and the other of electrode layers 10 and 11 may be made of a foil.

In Example 1, surfaces 12A and 13A of dielectric films 12 and 13 having electrode layers 10 and 11, respectively, have a surface roughness Ra of 45 nm. The other surfaces 12B and 13B of dielectric films 12 and 13 have a surface roughness Ra of 15 nm. Surfaces 12A and 13A thus have a surface roughness larger than that of surfaces 12B and 13B.

In Example 1, electrode layers 10 and 11 mainly contain aluminum.

In Example 1, external electrodes 15A and 15B are disposed at both ends of capacitor element 9, respectively. For example, external electrodes 15A and 15B are formed by thermally spraying zinc on the ends of capacitor element 9. External electrode 15A is electrically connected to electrode layer 10, and external electrode 15B is electrically connected to electrode layer 11, so that external electrodes 15A and 15B can be drawn to an outside. Dielectric film 12 extends in width direction DW and has ends 12C and 12D opposite to each other. Dielectric film 13 extends in width direction DW and has ends 13C and 13D opposite to each other. End 12C of dielectric film 12 and end 13D of dielectric film 13 are positioned along the same direction of dielectric films 12 and 13. End 12D of dielectric film 12 and end 13C of dielectric film 13 are positioned along the same direction of dielectric films 12 and 13. End 12C of dielectric film 12 meets end 10A of electrode layer 10. End 13C of dielectric film 13 meets end 11A of electrode layer 11. External electrode 15A is disposed at end 12C of dielectric film 12 and end 13D of dielectric film 13. External electrode 15B is disposed at end 12D of dielectric film 12 and end 13C of dielectric film 13.

External electrode 15A is connected to end 10A of electrode layer 10. Low resistance section 16A which is locally thicker is disposed at end 10A. Low resistance section 16A is formed by vapor-depositing a metal, such as zinc or aluminum, on electrode layer 10 made of aluminum, and has a resistance value less than that of electrode layer 10.

At end 12D of dielectric film 12, no electrode layer 10 is disposed and thus, insulating margin section 17A is disposed. Insulating margin section 17A ensures an insulating distance between the electrodes.

Similarly to electrode layer 10, external electrode 15B is connected to end 11A of electrode layer 11. Low resistance section 16B which is locally thicker is disposed at end 11A. Low resistance section 16B is formed by vapor-depositing a metal, such as zinc or aluminum, on electrode layer 11 made of aluminum, and has a resistance value less than that of electrode layer 11.

At end 13D of dielectric film 13, no electrode layer 11 is disposed, and thus, insulating margin section 17B is disposed. Insulating margin section 17B ensures an insulating distance between the electrodes.

Figure 2:
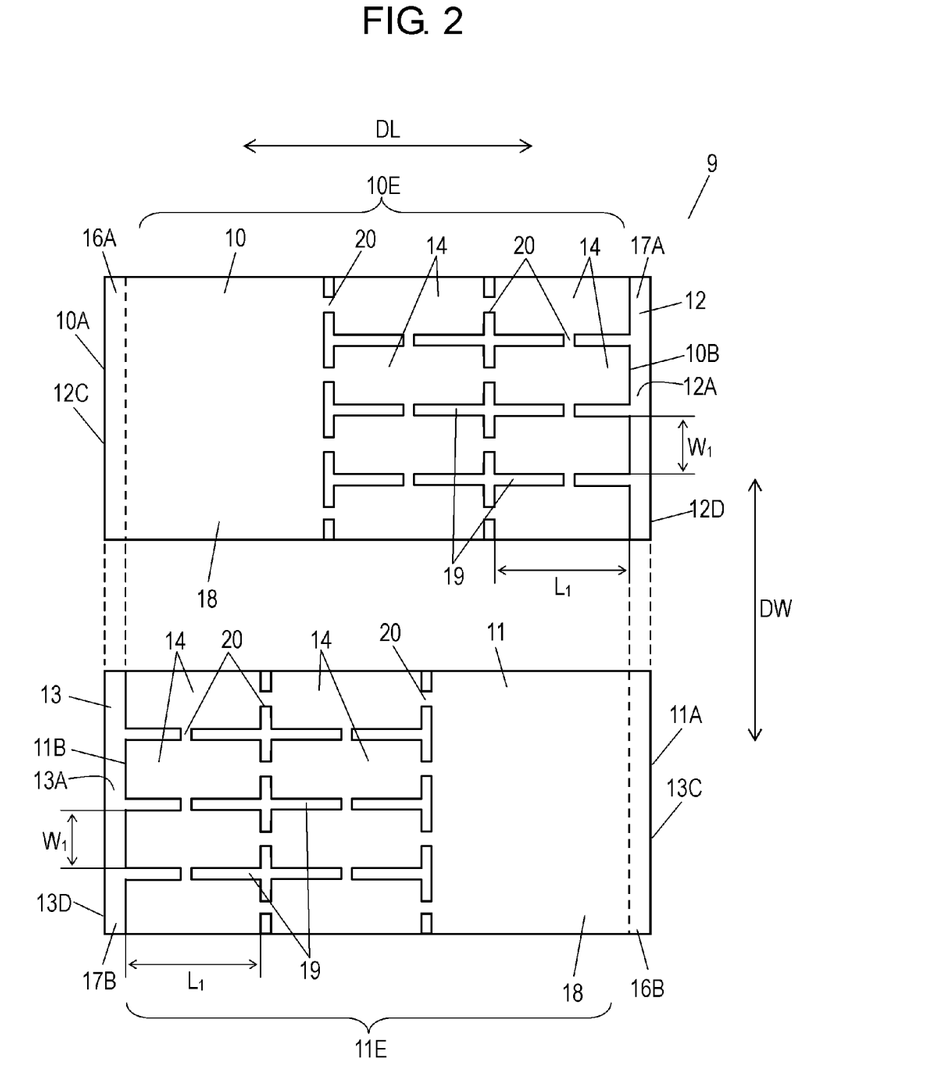
FIG. 2 is a top view of electrode layers of the capacitor element according to the embodiment.

FIG. 2 is a top view of electrode layer 10 disposed on dielectric film 12 and electrode layer 11 disposed on dielectric film 13. Electrode layer 10 and electrode layer 11 face each other, and include effective electrode sections 10E and 11E which form a capacitance of the capacitor, respectively.

Effective electrode section 10E of electrode layer 10 includes, in direction DX connecting external electrodes 15A and 15B, large electrode segment 18 on a side closer to end 10A, plural small electrode segments 14 on a side closer to end 10B, and plural fuses 20 connecting between large electrode segment 18 and small electrode segments 14.

Small electrode segments 14 are separated by slits 19 in longitudinal direction DL and width direction DW. Slits 19 have no electrode layer 10. In Example 1, small electrode segments 14 are arranged along two lines in longitudinal direction DL.

As shown in FIG. 2, fuses 20 electrically interconnect small electrode segments 14 separated by slits 19, and interconnect small electrode segments 14 and large electrode segment 18. Fuses 20 are parts of electrode layer 10, and are integrally formed with large electrode segment 18 and small electrode segments 14, thereby forming electrode layer 10.

Large electrode segment 18 is not separated by slits 19. Effective electrode section 10E may entirely include plural small electrode segments 14, but may include a combination of small electrode segments 14 and large electrode segment 18, similarly to Example 1. In the case where large electrode segment 18 and small electrode segments 14 are combined, large electrode segment 18 is disposed closer to external electrode 15A than small electrode segments 14 are. Since a large current flows through a portion near external electrode 15A of electrode layer 10, heat generation of capacitor element 9 can be reduced by reducing the resistance near external electrode 15A.

Effective electrode section 11E of electrode layer 11 includes, in direction DX, large electrode segment 18 on a side closer to end 11A, plural small electrode segments 14 on side closer to end 11B, and plural fuses 20 interconnecting large electrode segment 18 and small electrode segments 14.

Small electrode segments 14 are separated by slits 19 in longitudinal direction DL and width direction DW. Slits 19 have no electrode layer 11. In Example 1, small electrode segments 14 are arranged along two lines in longitudinal direction DL.

As shown in FIG. 2, fuses 20 electrically interconnect small electrode segments 14 separated by slits 19, and electrically interconnect small electrode segments 14 and large electrode segment 18. Fuses 20 are parts of electrode layer 11, and are integrally formed with large electrode segment 18 and small electrode segments 14, thereby forming electrode layer 11.

Large electrode segment 18 is not separated by slits 19. Effective electrode section 11E may entirely include plural small electrode segments 14, but may include a combination of small electrode segments 14 and large electrode segment 18, similarly to Example 1. In the case where large electrode segment 18 and small electrode segments 14 are combined, large electrode segment 18 is disposed closer to external electrode 15B than small electrode segments 14 are. Since a large current flows through a portion near external electrode 15B of electrode layer 11, heat generation of capacitor element 9 can be reduced by reducing the resistance near external electrode 15B.

Small electrode segments 14 of electrode layer 10 face large electrode segment 18 of electrode layer 11 across dielectric films 12 and 13. Small electrode segments 14 of electrode layer 11 face large electrode segment 18 of electrode layer 10 across dielectric films 12 and 13.

As described above, dielectric films 12 and 13 of capacitor element 9 according to Example 1 mainly contains a styrene polymer having a syndiotactic structure, further contains polyphenylene ether as non-crystalline polymer, and further contains inert fine particles.

The samples of Example 1 have thickness d1 which is the distance between surfaces 12A and 12B of dielectric film 12, of 2.0 μm, 2.5 μm, and 3.0 μm.

In each of the samples of capacitor element 9, the areas of small electrode segments 14 of electrode layers 10 and 11 are substantially identical to each other. The area of each small electrode segment 14 of each sample is changed.

Figure 3:
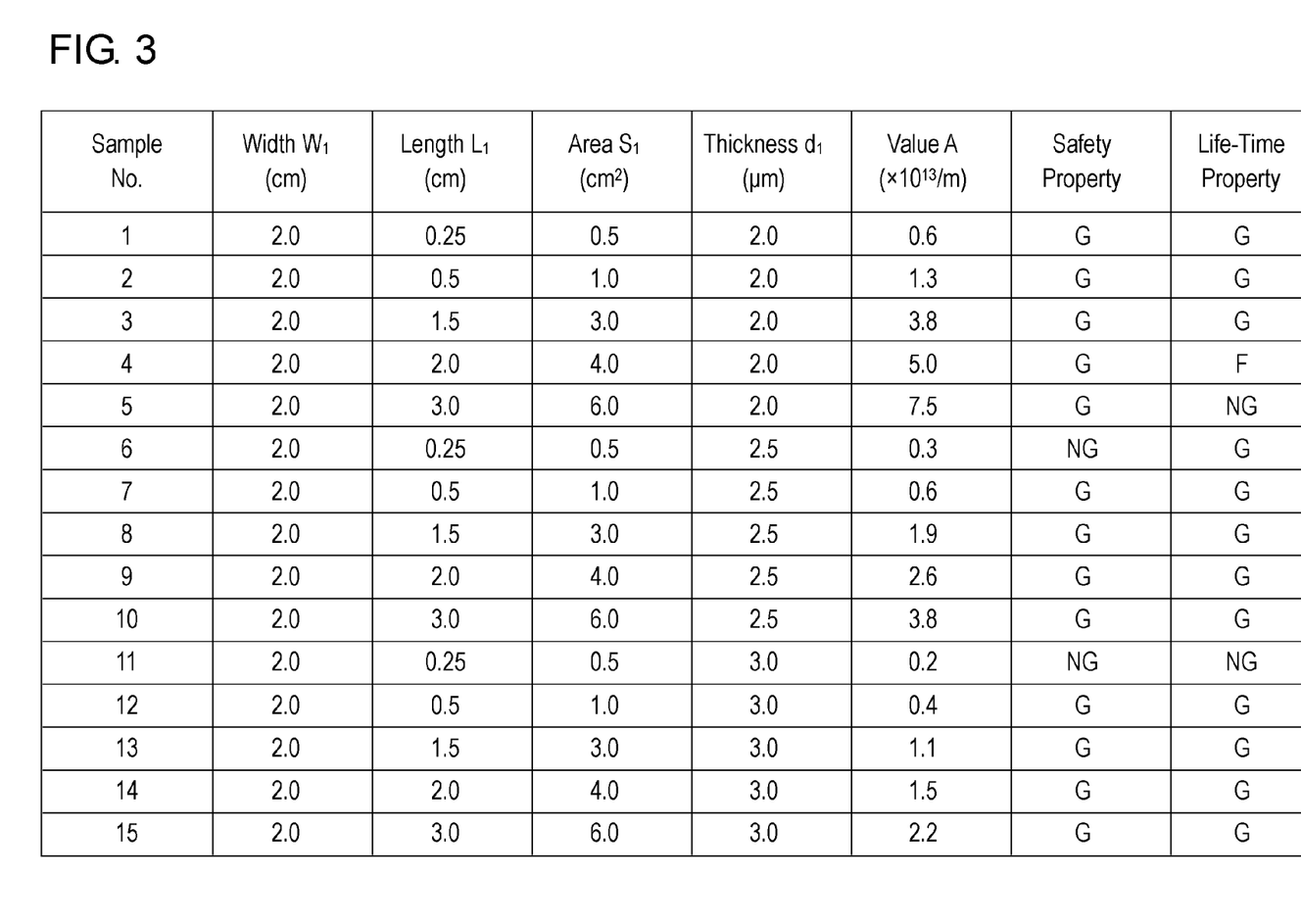
FIG. 3 illustrates evaluation results of the film capacitor according to the embodiment.

FIG. 3 illustrates evaluation results of samples of capacitor element 9 of the film capacitor according to Example 1 of the embodiment. FIG. 3 shows length L1 (cm), width W1 (cm), and area S1 (cm$^2$) of each small electrode segment 14; thickness d1 (μm) of each of dielectric films 12 and 13; value A obtained by dividing area S1 of each small electrode segment 14 by the third power of the thickness of each of dielectric films 12 and 13; safety property; and life-time property. The safety property here refers to the following capability: when an insulation failure occurs around a part of small electrode segments 14, fuses 20 connected to the part of small electrode segments 14 melt and prevent a short circuit between electrode layer 10 and electrode layer 11.

Length L1 is the length of each small electrode segment 14 in longitudinal direction DL illustrated in FIG. 1. Width W1 is the width of each small electrode segment 14 in width direction DW. Thickness d1 is the thickness of each of dielectric films 12 and 13.

The safety property in shown in FIG. 3 is defined as follows. Under an environmental temperature of 125° C., a voltage applied between external electrodes 15A and 15B of capacitor element 9 was increased from zero in increments of a predetermined voltage till the capacitance of capacitor element 9 is reduced by 50% from the initial capacitance. Subsequently, capacitor element 9 was disassembled for visual examination. As to the safety property in FIG. 3, symbol "G" denotes a sample in which fuses 20 operated normally, symbol "F" denotes a sample in which fuses 20 operated almost normally but dielectric films 12 and 13 partially had a small insulation failure spot, and symbol "NG" denotes a sample in which dielectric films 12 and 13 had a significant insulation failure spot and electrode layers 10 and 11 had a short circuit.

The life-time property shown in FIG. 3 is defined as follows. Samples of capacitor element 9 were left for 2000 hours under an environmental temperature of 125° C. and a voltage of 600V was applied. As to the life-time property shown in FIG. 3, symbol "G" denotes a sample having a capacitance reduction rate not larger than 5% from the initial capacitance, symbol "F" denotes a sample having a capacitance reduction rate larger than 5% and not smaller than 10%, and symbol "NG" denotes a sample having a capacitance reduction rate larger than 10%.

As shown in FIG. 3, the safety property is low in samples Nos. 6 and 11 having value A less than $0.4 \times 10^{13}$/m. Good safety property is obtained in sample No. 12 having value A of $0.4 \times 10^{13}$/m. Good safety property is also obtained in other samples having value A larger than $0.4 \times 10^{13}$/m. By keeping value A larger than $0.4 \times 10^{13}$/m, it is understood that energy applied to each small electrode segment 14 stabilizes an operation of fuses 20. Energy E applied to one of small electrode segments 14 forming capacitance C can be obtained by the following formulas for each of dielectric films 12 and 13 having a thickness $d_1$ and a permittivity $\in$, the area $S_1$ of each small electrode segment 14, and a voltage V applied between electrode layers 10 and 11.

$$E = (1/2) \cdot C \cdot V^2$$

$$C = \in \cdot (S_1/d_1)$$

$$E = (1/2) \cdot \in \cdot (S_1/d_1) \cdot V^2$$

Moreover, when applied voltage V is replaced with voltage per thickness ($V/d_1$), and permittivity $\in$ of dielectric films 12 and 13 and applied voltage V are assumed to be constant, the energy applied to one small electrode segment 14 is proportional to value A, i.e., the value obtained by dividing area $S_1$ of each small electrode segment 14 by the third power of thickness $d_1$ of each of dielectric films 12 and 13.

In Example 1, a polystyrene polymer having a syndiotactic structure is used for dielectric films 12 and 13, and value A is not smaller than $0.4 \times 10^{13}$/m. This configuration allows each small electrode segment 14 to have an appropriate size, which stabilizes operations of fuses 20 even when excessive voltage is applied. As a result, the self-healing property of the film capacitor improves, providing a higher withstanding voltage.

Furthermore, as shown in FIG. 3, in samples Nos. 1 to 3, 7 to 10, and 12 to 15 having value A not smaller than $0.4 \times 10^{13}$/m and smaller than $5.0 \times 10^{13}$/m, the capacitance of capacitor element 9 decreases slowly, which leads to a longer life time of capacitor element 9. The life time of sample No. 4 having value A of $5.0 \times 10^{13}$/m is relatively long, but is slightly shorter than that of samples Nos. 1 to 3, 7 to 10, and 12 to 15. Sample No. 5 having value A of $7.5 \times 10^{13}$/m, has a short life time and has a capacitance of capacitor element 9 decreasing quickly.

As described above, by keeping value A not larger than $5.0 \times 10^{13}$/m, each small electrode segment 14 can have an appropriate size, and insulation is efficiently recovered when fuses 20 operate. This reduces influences on the capacitance.

In sample No. 11 having value A of $0.2 \times 10^{13}$/m, fuses 20 are less likely to operate. This leads to a short life time of capacitor element 9 and accelerates reduction of the capacitance.

As described above, Example 1 having value A not smaller than $0.4 \times 10^{13}$/m and not smaller than $5.0 \times 10^{13}$/m increases the safety property of capacitor element 9 and improves the life-time property of capacitor element 9. Furthermore, as shown in FIG. 3, in the above described range of value A, a film capacitor having value A not smaller than $0.4 \times 10^{13}$/m and not larger than $1.3 \times 10^{13}$/m has relatively a preferable life-time property. A film capacitor having value A not smaller than $3.8 \times 10^{13}$/m and not larger than $5.0 \times 10^{13}$/m has relatively preferable safety property. A film capacitor having value A not smaller than $1.3 \times 10^{13}$/m and not larger than $3.8 \times 10^{13}$/m has a more preferable life-time property and safety property.

Example 2

In Example 2, safety property was compared between samples in which surface 12A of electrode layer 10 of dielectric film 12 and surface 13A of electrode layer 11 of dielectric film 13 have surface roughness Ra of 15 nm, 20 nm, 45 nm, 100 nm, and 150 nm.

In each sample, small electrode segment 14 has width W1 of 2.0 cm, length L1 of 5.0 cm, and area S1 of 10 cm$^2$, and dielectric films 12 and 13 have thickness d1 of 2.5 μm.

Figure 4:
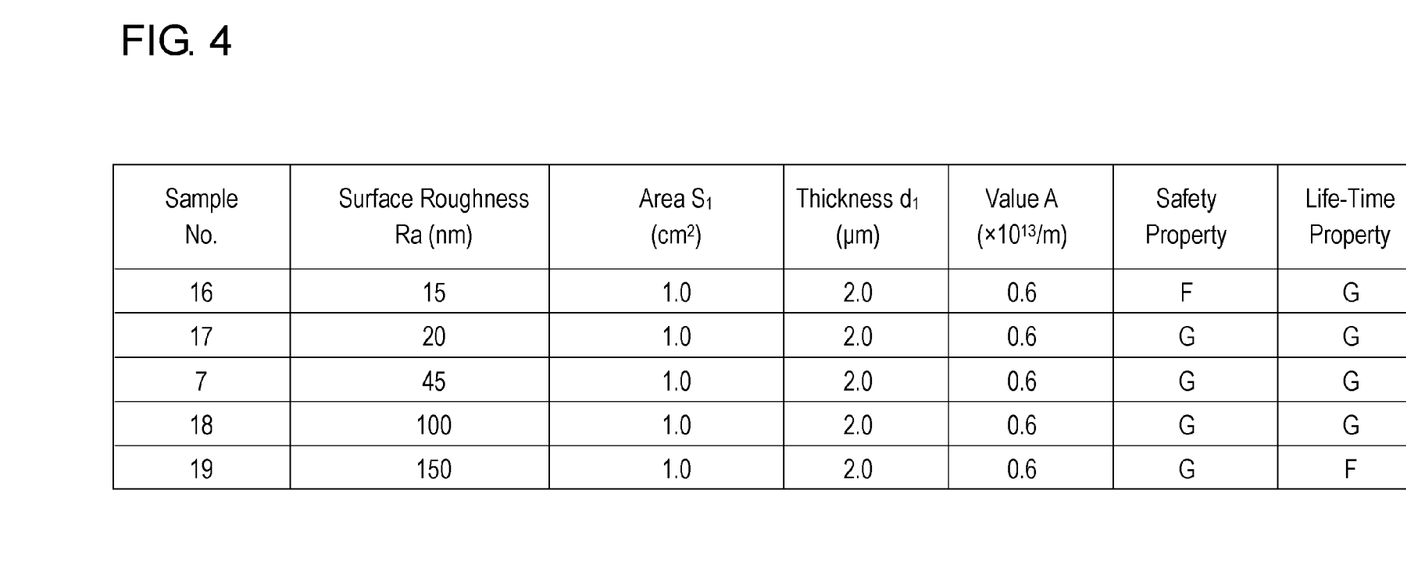
FIG. 4 illustrates evaluation results of the film capacitor according to the embodiment.

FIG. 4 illustrates the safety property of each sample. Similarly to Example 1, the safety property is defined as follows. Under an environmental temperature of 125° C., a voltage applied between external electrodes 15A and 15B of capacitor element 9 was increased from zero by increments of a predetermined voltage until the capacitance of capacitor element 9 was reduced by 50% from the initial capacitance. Subsequently, capacitor element 9 was disassembled for visual examination. As to the safety property in FIG. 4, symbol "G" denotes a sample having fuses 20 operating normally, symbol "F" denotes a sample having fuses 20 operating almost normally but dielectric films 12 and 13 partially having a small insulation failure spot, and symbol "NG" denotes a sample having dielectric films 12 and 13 having a significant insulation failure spot and electrode layers 10 and 11 having a short-circuit.

Similarly to Example 1, a life-time property shown in FIG. 4 is defined as follows. Samples of capacitor element 9 were left for 2000 hours under an environmental temperature of 125° C. and an applied voltage of 600 V. symbol "G" denotes a sample having a capacitance reduction rate not larger than 5% from the initial capacitance, symbol "F" denotes a sample having a capacitance reduction rate larger than 5% and not smaller than 10%, and symbol "NG" denotes a sample having a capacitance reduction rate larger than 10%.

As shown in FIG. 4, preferable safety property is obtained in samples in which the surface roughness Ra of surfaces 12A and 13A of dielectric films 12 and 13 is not smaller than 20 nm. This is because electrode layers 10 and 11 on the surfaces having surface roughness Ra not smaller than 20 nm larger produce appropriate gaps between dielectric film 12 and electrode layer 10 and between dielectric film 13 and electrode layer 11, thereby facilitating scattering of fuses 20. As described above, electrode layers 10 and 11 are likely to scatter, which facilitates operation of fuses 20. As a result, the film capacitor can have higher withstanding voltage.

Moreover, the life-time property can be improved by keeping surface roughness Ra of surfaces 12A and 13A of dielectric films 12 and 13 smaller than 150 nm. Surface roughness Ra not smaller than 150 nm produces large gaps between dielectric film 12 and electrode layer 10 and between dielectric film 13 and electrode layer 11. This causes fuses 20 to excessively operate, which degrades the life-time property.

As described above, a higher withstanding voltage can be obtained when surface roughness Ra of surfaces 12A and 13A is not smaller than 20 nm, and improved life-time property can be obtained when surface roughness Ra is smaller than 150 nm. Surface 12B of dielectric film 12 having no electrode layer 10 and surface 13B of dielectric film 13 having no electrode layer 11 are smooth surfaces. Surface roughness Ra of surfaces 12A and 13A of dielectric films 12 and 13 is adjusted by the particles to be added to dielectric films 12 and 13. Addition of the particles reduces insulating property, and thus, the amount of particles to be added is preferably kept as low as possible.

Figure 5:
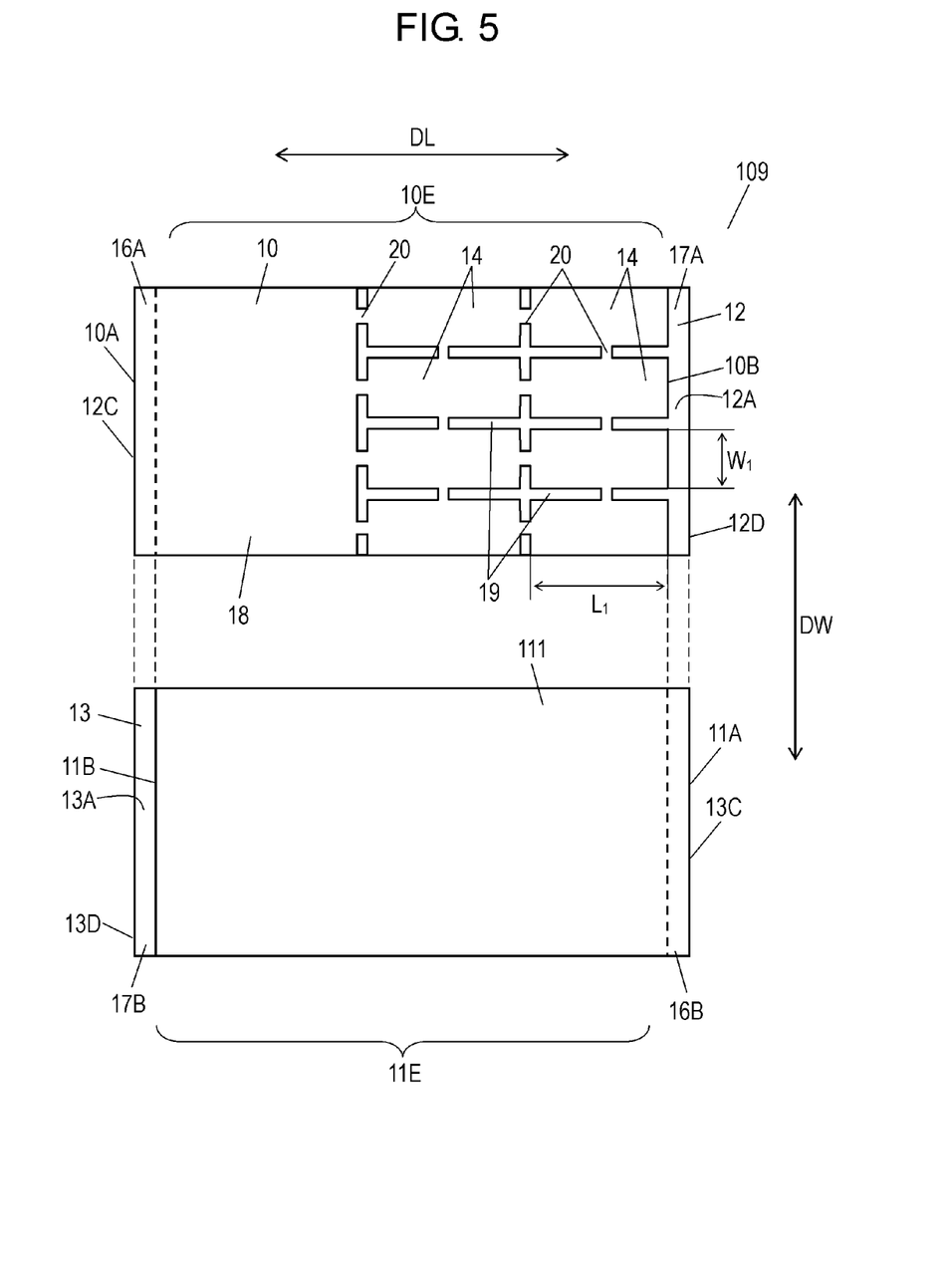
FIG. 5 is a top view of electrode layers of another capacitor element according to the embodiment.
Figure 6:
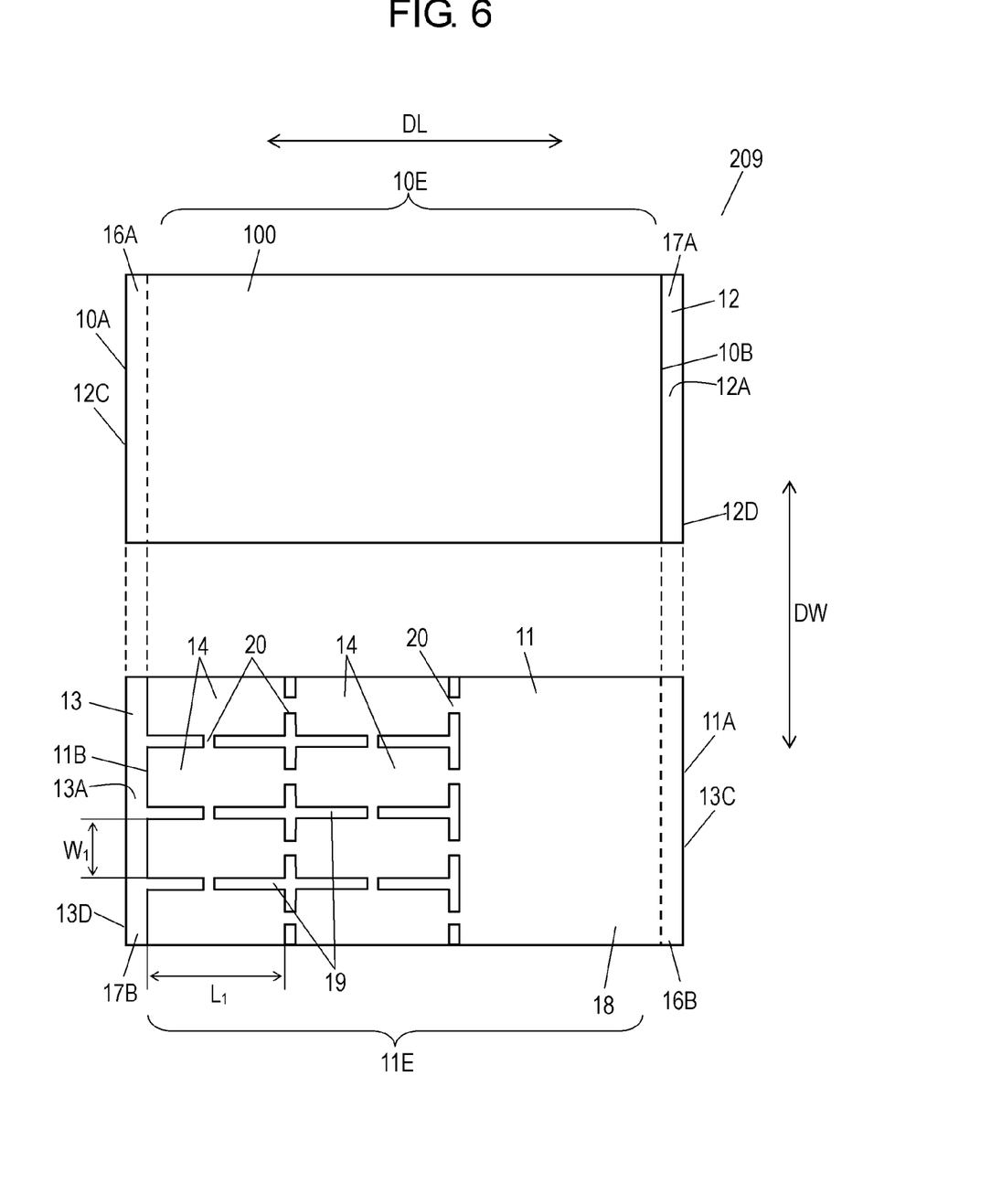
FIG. 6 is a top view of electrode layers of still another capacitor element according to the embodiment.

FIG. 5 is a top view of electrode layers 10 and 111 of another capacitor element 109 according to the embodiment. FIG. 6 is a top view of electrode layers 100 and electrode layer 11 of another capacitor element 209 according to the embodiment. In FIGS. 5 and 6, components identical to those of capacitor element 9 illustrated in FIGS. 1 and 2 are denoted by the same reference numerals. In capacitor element 9 illustrated in FIG. 1 and that is, in Examples 1 and 2, each of electrode layers 10 and 11 includes plural small electrode segments 14. Value A obtained by dividing the area of each small electrode segment 14 by the third power of the thickness of each of dielectric films 12 and 13 is not smaller than $0.4 \times 10^{13}$/m and not larger than $5.0 \times 10^{13}$/m. In capacitor element 9 according to the embodiment, only one of electrode layers 10 and 11 may include small electrode segments 14, and value A obtained by dividing the area of each small electrode segment 14 by the third power of the thickness of each of dielectric films 12 and 13 is not smaller than $0.4 \times 10^{13}$/m and not larger than $5.0 \times 10^{13}$/m.

In capacitor element 109 illustrated in FIG. 5, electrode layer 111 is not separated by slits 19, and faces large electrode segment 18 and small electrode segments 14 of electrode layer 10 across dielectric films 12 and 13. Electrode layer 10 includes small electrode segments 14. Value A obtained by dividing the area of each small electrode segment 14 by the third power of the thickness of each of dielectric films 12 and 13 is not smaller than $0.4 \times 10^{13}$/m and not larger than $5.0 \times 10^{13}$/m. This also increases the withstanding voltage of the film capacitor.

In capacitor element 209 illustrated in FIG. 6, electrode layer 100 is not separated by slits 19, and faces large electrode segment 18 and small electrode segments 14 of electrode layer 11 across dielectric films 12 and 13. Electrode layer 11 includes small electrode segments 14. Value A obtained by dividing the area of each small electrode segment 14 by the third power of the thickness of each of dielectric films 12 and 13 is not smaller than $0.4 \times 10^{13}$/m and not larger than $5.0 \times 10^{13}$/m. This also increases the withstanding voltage of the film capacitor.

INDUSTRIAL APPLICABILITY

A film capacitor according to the present invention has excellent withstanding voltage property, and is preferably used for a capacitor used in various electronic devices, electric apparatuses, industrial equipment, and automobiles, and particularly for automobile application that requires high withstanding voltage property.

REFERENCE MARKS IN THE DRAWINGS 9 capacitor element
10 electrode layer (first electrode layer)
11 electrode layer (second electrode layer)
12 dielectric film
12A surface of dielectric film 12 (first surface)
12B surface of dielectric film 12 (second surface)
13 dielectric film
14 small electrode segment (first small electrode segment, second small electrode segment)
20 fuse (first fuse, second fuse)

The invention claimed is:

1. A film capacitor comprising:
   a first electrode layer;
   a second electrode layer; and
   a dielectric film disposed between the first electrode layer and the second electrode layer,
   wherein the dielectric film mainly contains a styrene polymer having a syndiotactic structure,
   wherein the first electrode layer includes a plurality of first small electrode segments and a first fuse which interconnects the plurality of first small electrode segments, and
   wherein a value obtained by dividing an area of each of the plurality of first small electrode segments by a third power of a thickness of the dielectric film is not smaller than $0.4 \times 10^{13}$/m and not larger than $5.0 \times 10^{13}$/m.

2. The film capacitor according to claim 1,
   wherein the dielectric film has a first surface and a second surface opposite the first surface,
   wherein the first surface has a surface roughness larger than a surface roughness of the second surface, and
   wherein the first electrode layer is disposed on the first surface of the dielectric film.

3. The film capacitor according to claim 1, wherein the second electrode layer includes a plurality of second small electrode segments and a second fuse which interconnects the plurality of second small electrode segments.

4. The film capacitor according to claim 3, wherein a value obtained by dividing an area of each of the plurality of second small electrode segments by a third power of the thickness of the dielectric film is not smaller than $0.4 \times 10^{13}$/m and not larger than $5.0 \times 10^{13}$/m.

5. The film capacitor according to claim 1, wherein the value obtained by dividing the area of each of the plurality of first small electrode segments by the third power of the thickness of the dielectric film is not smaller than $0.4 \times 10^{13}$/m and not larger than $3.4 \times 10^{13}$/m.

6. The film capacitor according to claim 1, wherein the value obtained by dividing the area of each of the plurality of first small electrode segments by the third power of the thickness of the dielectric film is not smaller than $0.4 \times 10^{13}$/m and not larger than $1.3 \times 10^{13}$/m.

7. The film capacitor according to claim 1, wherein the dielectric film further contains inert fine particles.

8. The film capacitor according to claim 7, wherein the inert fine particles have an average particle size not smaller than 0.05 μm and not larger than 3.0 μm.

9. The film capacitor according to claim 7, wherein the inert fine particles are contained at a rate not larger than about 5.0% by mass with respect to the dielectric film.

10. The film capacitor according to claim 7, wherein the inert fine particles have spherical shapes.

11. The film capacitor according to claim 7, wherein the inert fine particles comprise organic fine particles.

12. The film capacitor according to claim 11, wherein the organic fine particles comprise polystyrene resin particles, silicone resin particles, or acrylic resin particles.

13. The film capacitor according to claim 11, wherein the inert fine particles further comprise inorganic fine particles.

14. The film capacitor according to claim 13, wherein the inorganic fine particles comprise calcium carbonate particles or silica particles.

15. The film capacitor according to claim 7, wherein the inert fine particles comprise inorganic fine particles.

16. The film capacitor according to claim 15, wherein the inorganic fine particles comprise calcium carbonate particles or silica particles.

17. The film capacitor according to claim 7, wherein the dielectric film further contains non-crystalline polymer.

18. The film capacitor according to claim 17, wherein the non-crystalline polymer has a glass transition temperature not lower than 130° C.

19. The film capacitor according to claim 17, wherein the non-crystalline polymer comprises polyphenylene ether.

20. The film capacitor according to claim 19, wherein the inert fine particles comprises silicone resin particles having spherical shapes.

* * * * *